(12) United States Patent
Laverne

(10) Patent No.: US 11,940,568 B2
(45) Date of Patent: Mar. 26, 2024

(54) ENHANCED MULTISPECTRAL SENSOR CALIBRATION

(71) Applicant: Argo AI, LLC, Pittsburgh, PA (US)

(72) Inventor: Michel H. J. Laverne, Pittsburgh, PA (US)

(73) Assignee: Argo AI, LLC, Pittsburgh, PA (US)

(*) Notice: Subject to any disclaimer, the term of this patent is extended or adjusted under 35 U.S.C. 154(b) by 694 days.

(21) Appl. No.: 16/995,160

(22) Filed: Aug. 17, 2020

(65) Prior Publication Data

US 2022/0050188 A1 Feb. 17, 2022

(51) Int. Cl.

| | |
|---|---|
| *G01S 7/497* | (2006.01) |
| *G01J 5/00* | (2022.01) |
| *G01S 7/481* | (2006.01) |
| *G01S 17/10* | (2020.01) |
| *G01S 17/894* | (2020.01) |
| *G01S 17/931* | (2020.01) |
| *G01J 5/80* | (2022.01) |

(52) U.S. Cl.
CPC .............. *G01S 7/497* (2013.01); *G01J 5/00* (2013.01); *G01S 7/4814* (2013.01); *G01S 7/4816* (2013.01); *G01S 17/10* (2013.01); *G01S 17/894* (2020.01); *G01S 17/931* (2020.01); *G01J 5/80* (2022.01)

(58) Field of Classification Search
CPC ........................................ G01S 7/497
See application file for complete search history.

(56) References Cited

U.S. PATENT DOCUMENTS

| | | |
|---|---|---|
| 10,018,711 B1 | 7/2018 | Sebastian et al. |
| 10,429,496 B2 | 10/2019 | Weinberg |
| 2004/0217260 A1 | 11/2004 | Bernardini et al. |
| 2008/0121413 A1* | 5/2008 | Cardona ............. H05K 1/0269 174/250 |
| 2012/0069193 A1 | 3/2012 | Ramegowda et al. |

(Continued)

FOREIGN PATENT DOCUMENTS

| | | | | |
|---|---|---|---|---|
| EP | 3589913 B1 * | 5/2022 | ............. | G01C 25/00 |
| JP | 5388417 B2 | 1/2014 | | |

(Continued)

OTHER PUBLICATIONS

Screen capture of computer board from "www.alamy.com/stock-image-computer-hardware-closeup-electronic-circuit-board-background-selective-164399459.html" the image taken dated Oct. 24, 2017. (Year: 2017).*

(Continued)

*Primary Examiner* — Yuqing Xiao
*Assistant Examiner* — Zhengqing Qi
(74) *Attorney, Agent, or Firm* — Fox Rothschild LLP

(57) ABSTRACT

Devices, systems, and methods are provided for enhanced multispectral sensor calibration. A device may include a first layer having copper, a second layer having solder material, the second layer above the first layer, and a third layer having a white silkscreen material, the third layer above the second layer. Regarding the device, the first layer may be used for calibration of a thermal sensor, the second layer may be used for calibration of an image sensor and calibration of a light detection and ranging (LIDAR) sensor, and the third layer may be used for the calibration of the image sensor and the calibration of the LIDAR sensor.

20 Claims, 6 Drawing Sheets

(56) References Cited

U.S. PATENT DOCUMENTS

| | | | |
|---|---|---|---|
| 2015/0317781 A1* | 11/2015 | Napier | G06T 5/002 |
| | | | 348/46 |
| 2019/0056483 A1 | 2/2019 | Bradley et al. | |
| 2019/0056484 A1 | 2/2019 | Bradley et al. | |
| 2019/0072650 A1 | 3/2019 | Tatipamula et al. | |
| 2019/0212422 A1 | 7/2019 | Yang et al. | |
| 2019/0353784 A1 | 11/2019 | Toledano et al. | |
| 2019/0362520 A1 | 11/2019 | Oyaizu | |
| 2021/0004610 A1* | 1/2021 | Huang | G01S 7/497 |
| 2021/0303898 A1* | 9/2021 | Wang | G06V 20/10 |

FOREIGN PATENT DOCUMENTS

| | | |
|---|---|---|
| KR | 20130066760 A | 6/2013 |
| RU | 2015130719 A | 1/2017 |
| WO | 2019064062 A1 | 4/2019 |

OTHER PUBLICATIONS

Krishnan et al. "Cross-Calibration of RGB and Thermal cameras with a Lidar" IROS 2015 Workshop on Alternative Sensing for Robot Perception (WASRoP), 2015, pp. 1-7.

Zhang et al. "SLAT-Calib: Extrinsic Calibration between a Sparse 3D LiDAR and a Limited-FOV Low-resolution Thermal Camera", Proceeding of the IEEE International Conference on Robotics and Biomimetics, Dec. 2019, pp. 1-6, Dali, China.

Kaasalainen et al. "Radiometric Calibration of LIDAR Intensity With Commercially Available Reference Targets", IEEE Transactions on Geoscience and Remote Sensing, Feb. 2009, pp. 588-598, vol. 47, issue 2.

International Search Report & Written Opinion of PCT/US2021/046236 dated Dec. 7, 2021, 9 pages.

* cited by examiner

ENHANCED MULTISPECTRAL SENSOR CALIBRATION

TECHNICAL FIELD

This disclosure generally relates to systems and methods for multispectral sensor calibration.

BACKGROUND

Sensors increasingly are being used in a variety of applications to control machines. Sensors may require calibration to ensure data accuracy and precision. Calibration of multispectral sensors may need to be intrinsic (e.g., sensors may need to be calibrated individually) and extrinsic (e.g., sensors may need to be calibrated with respect to one another). Without such calibration, data captured by one sensor may be inconsistent with data captured by another sensor. For example, one sensor's data may indicate that an object is at one location, and another sensor's data may indicate that the same object is at another location. Therefore, there is need to enhance intrinsic and extrinsic calibration of multiple multispectral sensors in close proximity to one another to ensure that the sensors do not provide inconsistent data that undermines the controls for a machine.

Figure 1:
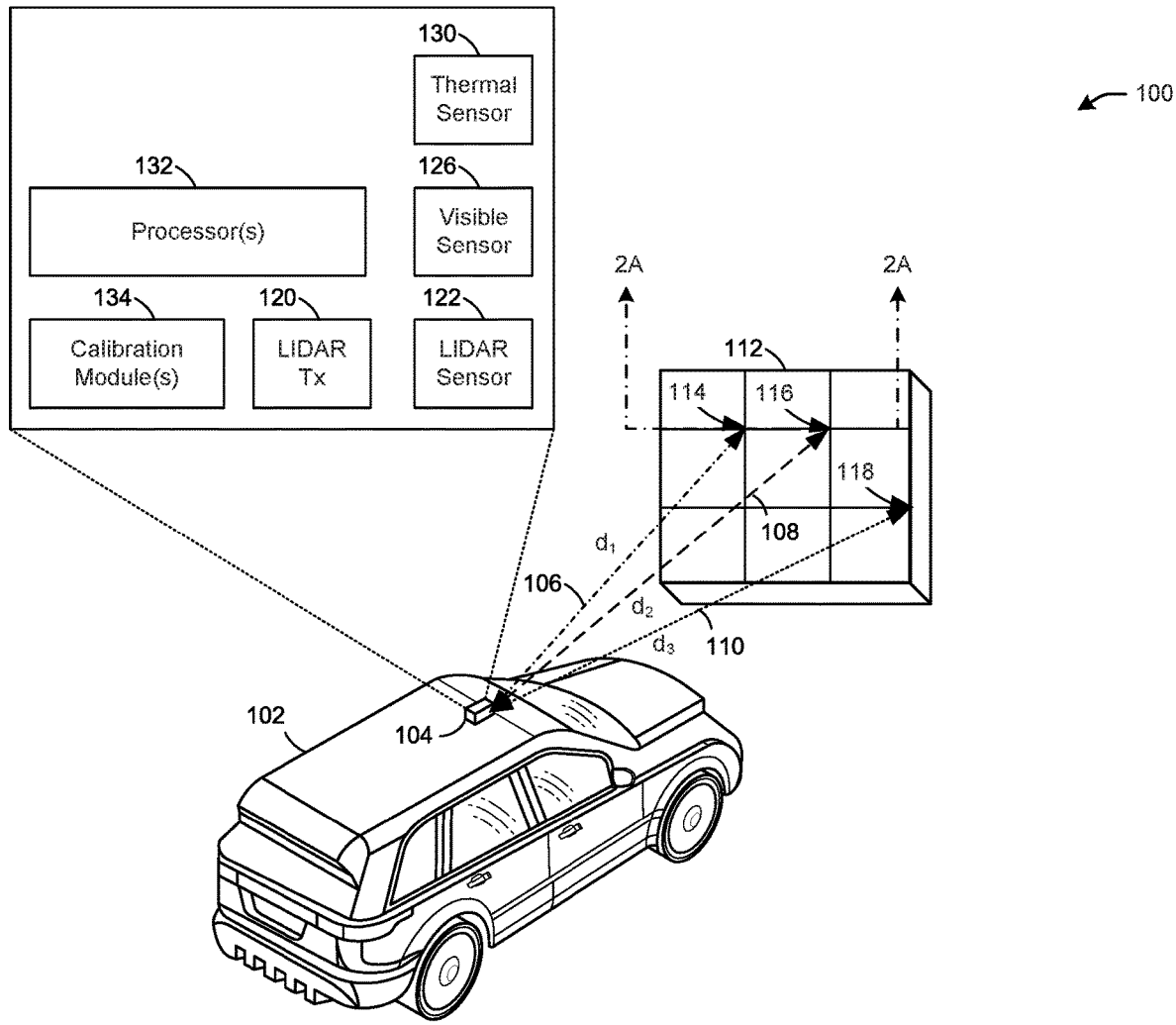
FIG. 1 illustrates example calibration tool for multispectral sensors for a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for enhanced multispectral sensor calibration.

Sensors using different modalities may be implemented to control a variety of equipment, machines, autonomous vehicles, and the like. For example, light detection and ranging (LIDAR) sensors may be used to detect objects and object distances from LIDAR sensors. Temperature (e.g., thermal) sensors may be used to detect temperatures, which may correspond to objects and conductive materials that exhibit heat. Visible (e.g., image) sensors may be used to capture image data for analysis of objects represented by image data (e.g., pixel data of an image). Control of an autonomous vehicle may rely, at least in part, on an ability to detect objects and their locations with respect to the vehicle. A combination of LIDAR, visible, and thermal sensor data may be analyzed to detect objects and object distances.

When multiple sensors of different sensing modalities are used for a device such as an autonomous vehicle, the sensors may be arranged near one another, such as in an array of sensors on or near one or more surfaces of the vehicle. For example, a LIDAR sensor and a visible sensor may be next to one another, and their respective data may be used to identify the location of an object or surface. LIDAR distance data and visible image data may be used to identify objects and their locations. Without both intrinsic and extrinsic calibration, LIDAR and visible sensor data corresponding to a same object or surface may indicate conflicting locations of the same object or surface.

Some existing sensor calibration tools may calibrate different types of sensors with different sensing modalities, but without a common calibration target, the individual calibration of different sensors may result in reprojection issues that undermine the control of machines.

Therefore, there is a need to enhance the calibration of multiple sensors of different sensing modalities to provide a redundant perception of the multiple sensors for use in controlling objects.

In one or more embodiments, existing printed circuit board manufacturing capabilities may be leveraged to provide calibration targets for sensors using different spectrums (e.g., visible, long-wave infrared, etc.). A printed circuit board (PCB) stack-up arrangement (e.g., an arrangement of layers of a PCB) may allow for visual and thermal features to be positioned close to one another, thereby limiting reprojection issues in which sensor data from LIDAR sensors, visible sensors, and thermal sensors do not identify the same object or surface at a same physical location. For example, the PCB stack-up arrangement may have a lower (e.g., core) layer, a thermal layer (e.g., copper material) above the core layer, a black solder mask layer (e.g., solder material) above the thermal layer, and a white silkscreen (e.g., silkscreen material) above the black solder mask layer. The white silkscreen layer may not overlay the entire top surface of the black solder layer, and the thermal layer may not overlay the entire top surface of the core layer. In this manner, the surfaces (e.g., edges, sides) where the white silkscreen layer ends and exposes the black solder mask layer below may be visible features identifiable with LIDAR data and visible image data. The edges and trace corners of the copper layer (e.g., a conductive layer representing resistors) may be thermal features detectable using thermal sensor data. The trace corners of the copper layer may be aligned horizontally with the sides of the while silkscreen layer as shown further herein. In this manner, the sides or edges of a white silkscreen layer may indicate a location (e.g., axially coordinate) that should be the same location as the edges or trace corner of a copper or other conductive layer.

In one or more embodiments, when the location of the elements of the PCB stack-up is known, the LIDAR, thermal, and visible sensors may be calibrated so that their data are consistent with one another. For example, the LIDAR data and the visible data may be calibrated so that a visible feature of the PCB stack-up is at the same location based on both the LIDAR data and the visible data, and the thermal sensor may be calibrated so that the thermal data indicating the location of the thermal layer corresponds with the known location of the thermal layer (e.g., which may correspond to a location of the visible feature). The PCB stack-up may be used as a calibration tool for multispectral sensor arrays, and may be scalable to provide larger or smaller features as shown further herein. The use of the PCB stack-up with visible and thermal elements may allow for a common calibration target to use in the intrinsic and extrinsic calibration of multiple sensors using different sensing modalities.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example calibration 100 of multispectral sensors for a vehicle, in accordance with one or more example embodiments of the present disclosure.

Referring to FIG. 1, the calibration 100 may include a vehicle 102 having an object detection system 104 comprising one or more object detection devices. The object detection system 104 may be operatively connected to the vehicle 102 (e.g., on top of the vehicle 102 as shown). The one or more object detection devices of the ranging system 104 may transmit and/or detect one or more signals (e.g., signal 106, signal 108, signal 110) using different modalities, such as but not limited to LIDAR (e.g., light waves), visible (e.g., image data in the visible spectrum), and thermal (e.g., temperature of an object). Certain of these modalities may require transmission of a signal and the detection of a return signal reflected by an object, such as with LIDAR device, and others may merely collect data, such as thermal radiation in the case of a thermal sensor.

Still referring to FIG. 1, to calibrate the one or more object detection devices of the object detection system 104 both intrinsically and extrinsically, the calibration 100 may use a calibration tool 112 that may be placed near the vehicle 102 (e.g., in front of the vehicle 102, as shown). The one or more signals may be used to determine objects (e.g., side or edge 114, side or edge 116, side or edge 118) associated with the calibration tool 112, and object distances from the one or more devices of the object detection system 104. LIDAR signals of the one or more signals may be used to determine the distance of one of the sides or edges of the calibration tool 112 from the one or more devices of the object detection system 104, and the side or edge distance data may be used to construct a LIDAR image with which the sides or edges may be identified. Images captured of the calibration tool 112 by the one or more object detection devices of the object detection system 104 may be used by the one or more objection detection devices of the object detection system 104 to identify the sides or edges. Thermal readings of the calibration tool may be used by the one or more objection detection devices of the object detection system 104 to identify material of the calibration tool 112 based on heat of the material. In this manner, the heat of conductive material used in the calibration tool 112 may be identified along with the location of the detected heat. For example, the side or edge 114 may have a set of location coordinates on the X-Y-Z coordinate system relative to the calibration tool 112. The side or edge 116 may have another set of location coordinates on the X-Y-Z coordinate system relative to the calibration tool 112. The side or edge 118 may have another set of location coordinates on the X-Y-Z coordinate system relative to the calibration tool 112. LIDAR sensor data may be used to determine object location based on their distances (e.g., distance d1 from the one or more objection detection devices of the object detection system 104 and the side or edge 114, distance d2 from the one or more object detection devices of the object detection system 104 and the side or edge 116, distance d3 from the one or more object detection devices of the object detection system 104 and the side or edge 118). To ensure that the LIDAR data is accurate, image data and thermal data of the object detection system 104 may be used to identify the same sides or edges or other corresponding objects (e.g., sides or edges of conductive material below the layer of the calibration tool 112 that is closest to the one or more object detection devices of the object detection system 104, as explained further herein) and their locations. Since the locations of the sides or edges are known (e.g., based on the manufacturing of the calibration tool 112), the locations of the sides or edges respectively determined based on data from the different devices of the object detection system should be the same. When data from the one or more devices of the object detection system 104 results in determinations of inconsistent object locations, any one of the devices of the object detection system 104 may be adjusted until the data from the devices is consistent to allow for precise locating of an object, such as the position of another vehicle relative to the vehicle 102.

In one or more embodiments, the object detection system 104 may include LIDAR devices (e.g., a LIDAR signal transmitter Tx 120 and a LIDAR signal sensor 122), such as Geiger mode LIDAR, ground-based LIDAR, large footprint LIDAR, small footprint LIDAR, and the like. The object detection system 104 may include visible image capturing devices (e.g., a visible image sensor 126) such as image detecting sensors. For example, a visible image-capturing device may include a CMOS sensor, a charge-coupled device, and other types of sensors. The object detection system 104 may include a temperature device (e.g., a thermal signal sensor 130), such as thermistors, resistance temperature detectors, thermocouples, semi-conductors, and the like. When the object detection system 104 includes multiple devices, such as an array of sensors including the LIDAR sensor 122, the thermal sensor 130, and the visible image sensor 126, the sensors in the array may be calibrated both intrinsically and extrinsically using the calibration tool 112. One or more processors 132 may control the transmission of signals using the LIDAR signal transmitter 120. One or more calibration modules 134 may compare data received/detected by each of the sensors to determine for each a respective X-Y-Z coordinates and, for LIDAR data detected by the LIDAR sensor 122, object distances (e.g., d1, d2, d3, as shown in FIG. 1) of the objects (e.g., sides or edges) of the calibration tool 112 to determine whether data from the respective sensors matches, within a threshold, the known X-Y-Z coordinates of the objects of the calibration tool 112.

In particular, when calibrated correctly, data received by the LIDAR sensor 122 should indicate that the side or edge 114 is at a distance d1 from the object detection system 104, and based on the distance d1, that the side or edge 114 is at a location corresponding to X-Y-Z coordinates. When the location of the calibration tool 112 is known (e.g., its distance from the object detection system 104 is known), and when the location of the side or edge 114 is known, then the LIDAR sensor 122 data should match the known distance d1 and the known X-Y-Z location of the side or edge 114. The LIDAR signal transmitter 120 may transmit a signal (e.g., signal 106) toward the calibration tool 112, and the signal may reflect back as a return signal. The LIDAR sensor 122 may receive the return signal. Based on the time-of-flight from the time that the signal was transmitted using the LIDAR signal transmitter 120 and the LIDAR sensor 122, the one or more calibration modules 134 may determine the distance to the side or edge 114 of the calibration tool 112, and may use the distance to determine the X-Y-Z location of the side or edge 114. When the distance and/or location determined by the one or more calibration modules 134 does not match the known distance d1 and/or location, the one or more calibration modules 134 may adjust settings of the LIDAR signal transmitter 120 and/or the LIDAR sensor 122.

Data from the visible sensor 126 and/or the thermal sensor 130 should indicate that the side or edge 114 has the same known X-Y-Z location. Any sensors of the object detection system 104 may be adjusted when sensor data indicates that the side or edge 114 is not at the known location. For example, based on image data captured by the visible sensor, the one or more calibration modules 134 may determine the location of the side or edge 114 of the calibration tool 112. When the distance determined by the one or more calibration modules 134 does not match the known location, the one or more calibration modules 134 may adjust settings of the visible sensor 126. The thermal sensor 130 may detect the temperature of the calibration tool 112 at one or more locations. Based on the temperature data captured by the thermal sensor 130, the one or more calibration modules 134 may determine the location the side or edge 114 of the calibration tool 112. When the location determined by the one or more calibration modules 134 does not match the known location, the one or more calibration modules 134 may adjust settings of the thermal sensor 130.

In one or more embodiments, the one or more processors 132 may receive and analyze data captured by the LIDAR sensor 122, the visible sensor 126, and/or the thermal sensor 130 (and/or any additional LIDAR sensors, visible sensors, and/or thermal sensors associated with the object detection system 104). The one or more processors may analyze LIDAR data, visible image data, and thermal data to determine the presence and location of objects detected by the respective data sets. Using known locations of objects on the calibration tool 112, as described further below, the object detection system 104 (e.g., the LIDAR transmitter 120, the LIDAR receiver 122, the visible sensor 126, and the thermal sensor 130) may be calibrated by the one or more processors 132 by adjusting any of the devices so that object location data captured by any receiver device (e.g., a sensor) matches a known object location. Using the sensor data, the one or more processors 132 may control the operation of the vehicle 102 by adjusting speed, velocity, acceleration, direction of motion, and the like.

In one or more embodiments, the LIDAR signal transmitter 120 may include a laser source, such as a diode laser or other type of laser, which emits optical signals. The one or more processors 132 may cause the LIDAR signal transmitter 120 to emit the optical signals. The return signals received by the LIDAR sensor 122 may be reflected optical signals.

In one or more embodiments, the LIDAR sensor 122 may include an array of photodetector pixels (not shown). The detector pixels of the LIDAR sensor 122 may produce an electrical pulse in response to the detection of a photon, allowing for sub-nanosecond precision photon-flight-time measurements. When a pixel is armed, the pixel may detect a low-intensity reflection of an interrogation signal (e.g., a return signal) and output a signal to be detected and subsequently used by the one or more processors 132 and/or the one or more calibration modules 134.

In one or more embodiments, the LIDAR sensor 122, the visible sensor 126, and/or the thermal sensor 130 may function as scanners that may detect data during a scan period such that object detection system 104 may detect the surrounding area (e.g., the calibration tool 112) during a scan period. For example, a scanner used by any sensor may include a galvanometer scanner, a rotating, multi-faceted mirror, a scanning MEMS mirror, and/or a transmissive element(s) (i.e., a scanning prism, etc.) that steers optical signals via any of a number of known mechanisms including refraction, and the like.

In one or more embodiments, the object detection system 104 may scan large areas while collecting many data points, each having X-Y-X coordinate values. The aggregation of the data points may be referred to as a point cloud data set. The one or more processors 132 may identify object locations from the point clouds data set and use that location information for subsequent decision making (e.g., controlling the vehicle 102). The one or more processors 132 may generate a map representing an area around the vehicle 102 based on the data detected by the object detection system 104. Point cloud data sets may be collected by Geiger-mode avalanche photodiodes (e.g., the LIDAR signal receiver 122). The object detection system 104 may be mounted on movable platforms such as the vehicle 102, and/or on other movable platforms including land, sea, airborne and/or space vehicles The object detection system 104 may be configured or individually combined to sweep or scan over a large volume such that a full 360-degree environmental view may be made.

In one or more embodiments, the object detection system 104 may exhibit a number of characteristics. For example, an automotive LIDAR system may require a large field-of-view in both horizontal and vertical directions.

In one or more embodiments, object detection system 104 may exhibit a high resolution and an ability to identify a changing environment around the vehicle 102, which may be moving at a high speed. Accordingly, the one or more processors 132 may need to be able to update the generated local map of the area around the vehicle 102 at a very high frequency. The object detection system 104 may exhibit a high signal-to-noise ratio (SNR) over a wide range of ambient light conditions and the entire operating distance (i.e., scan range) of the sensors of the object detection system 104.

Figure 2A:
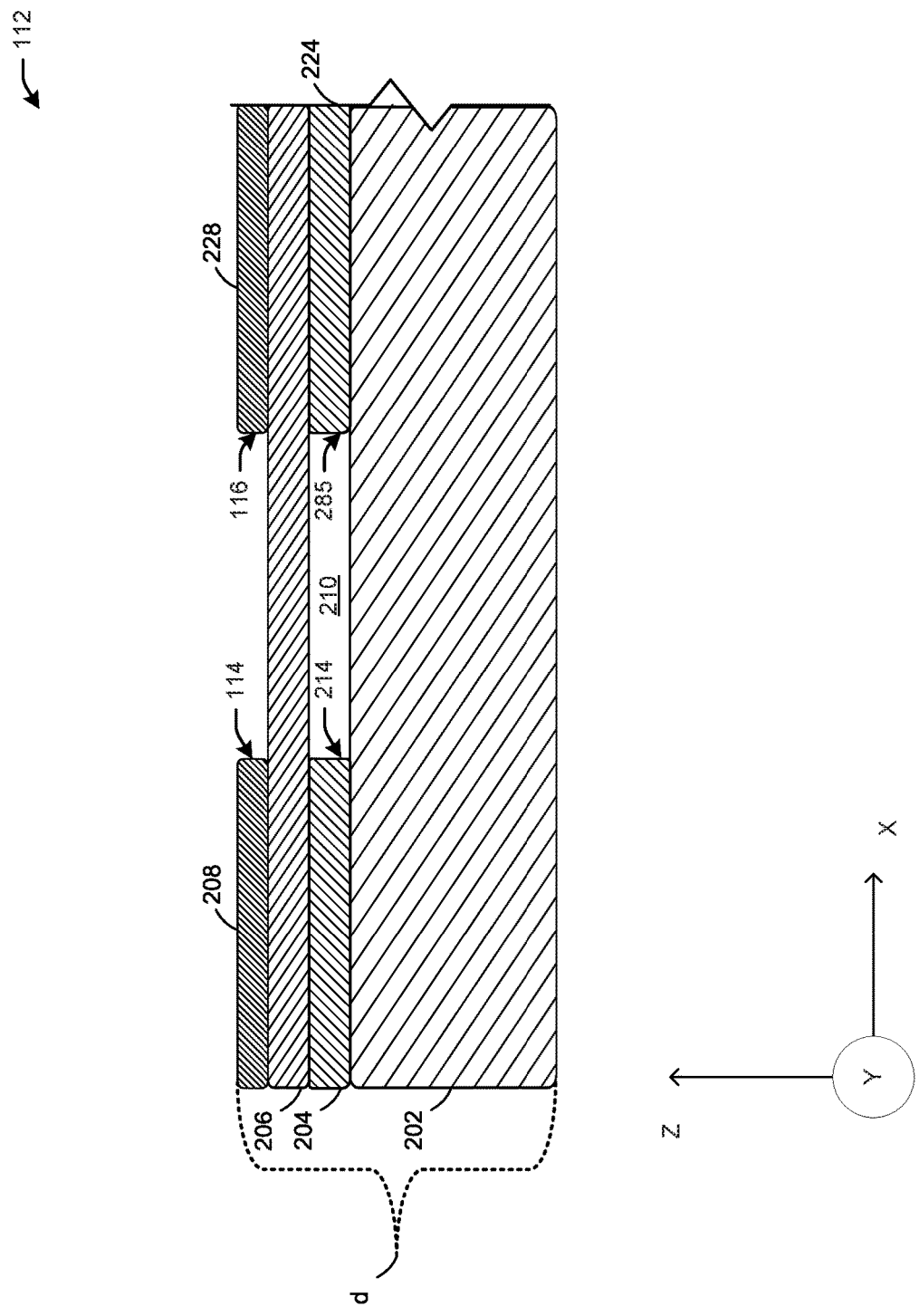
FIG. 2A illustrates an example cross-section view of the calibration tool of FIG. 1, in accordance with one or more example embodiments of the present disclosure.

FIG. 2A illustrates an example cross-section view of the calibration tool 112 of FIG. 1, in accordance with one or more example embodiments of the present disclosure.

Referring to FIG. 2A, a cross-section view shows a first layer 202 (e.g., a core layer having fiberglass, epoxy resin, and/or another substrate material), a conductive layer 204 (e.g., including copper, aluminum, gold, iron, etc.), a solder mask 206 (e.g., including solder material such as a black solder mask, green solder mask, red solder mask, or solder resist, etc.), a silkscreen 208 (e.g., a white silkscreen or another color used to identify components and/or locations on the calibration tool 112), and a gap 210. The first layer 202, the conductive layer 204, the solder mask 206, and the silkscreen 208 may have a thickness of d (e.g., approximately 63 millimeters (+/−15 millimeters) or another suitable thickness). The conductive layer 204 may be disposed above the first layer 202, and may span a portion of the first layer 202, allowing the gap 210 (or cavity) between a portion of the first layer 202 and the solder mask 206, which solder mask layer 206 may be disposed above the conductive layer 204. In this manner, the first layer 202 may be partially, but not entirely, covered by the conductive layer 204. The silkscreen 208 may be disposed on the solder mask 206, and may span a portion of the solder mask 206 so that the solder mask 206 is not entirely covered by the silkscreen 208, for example, above or opposite the gap 210. The side or edge 114 may refer to the edge or side at which the silkscreen 208 ends and exposes the solder mask 206. The side or edge 114 may align (e.g., along the X-axis as shown) with the edge or side 214 at which the conductive layer 204 ends and the gap 210 begins. In this manner, while the conductive layer 204 may be below the silkscreen 208 and the solder mask 206, the X-axis coordinate of the side or edge 114 and the edge or side 214 of the conductive layer 204 may be the same. Because thermal sensor data may indicate the presence and location of the conductive layer 204 and the side 214, because visible and LIDAR sensor data may indicate the presence and location of the side or edge 114, and because the side or edge 114 and the side 214 share the same X-coordinate, data from sensors having different modalities may be compared against one another for correlation to ensure that any sensor's data indicates the same presence and location of an object as another sensor's data on which a machine (e.g., the vehicle 102 of FIG. 1) may rely.

Still referring to FIG. 2A, the calibration tool 112 may include a conductive layer 224 disposed on the core layer 202 may be separated from the conductive layer 204 along the X-axis by the gap 210. The solder mask 206 may be disposed on the conductive layer 224 and may extend along the X-axis underneath the silkscreen 208 and a silkscreen 228 (e.g., the silkscreen 208 and the silkscreen 228 may be separated from one another to expose a portion of the solder mask 206 below)

In one or more embodiments, because the side or edge 114 may align (e.g., along the X-axis as shown) with the edge or side 214 of the conductive layer 204, thermal sensor data may indicate the presence and location of the conductive layer 204 and the side 214. Because visible and LIDAR sensor data (e.g., indicating the distance d1 of FIG. 1 to the side or edge 114) may indicate the presence and location of the side or edge 114, and because the side or edge 114 and the edge or side 214 share the same X-coordinate, data from sensors having different modalities (e.g., LIDAR data detected by the LIDAR sensor 122 of FIG. 1, visible image data detected by the visible image sensor 126, and/or temperature data detected by the thermal sensor 130) should indicate that the X-coordinate of the side or edge 114 (e.g., the edge or side of the silkscreen 208) is the same as the X-coordinate of the edge or side 214 of the conductive layer 204. Similarly, the X coordinate of the side or edge 116 (e.g., the edge or side of the silkscreen 228) should have the same X-coordinate as the edge or side 285 of the conductive layer 224 below. In this manner, the vehicle 102 may be controlled based on the recognition of objects and their locations using calibrated sensor data from different ranging modalities. For example, the speed and/or direction of the vehicle 102 may be set and/or modified based on whether sensor data indicates that an object is in the path of the vehicle 102, whether the vehicle 102 is approaching a stop sign or stop light, and the like. The location of objects on or in the calibration tool 112 may be used to calibrate the sensors of the object detection system 104 of FIG. 1 for the control of the vehicle 102. The design and fabrication of the calibration tool 112 may facilitate the calibration of sensors of the object detection system 104.

Figure 2B:
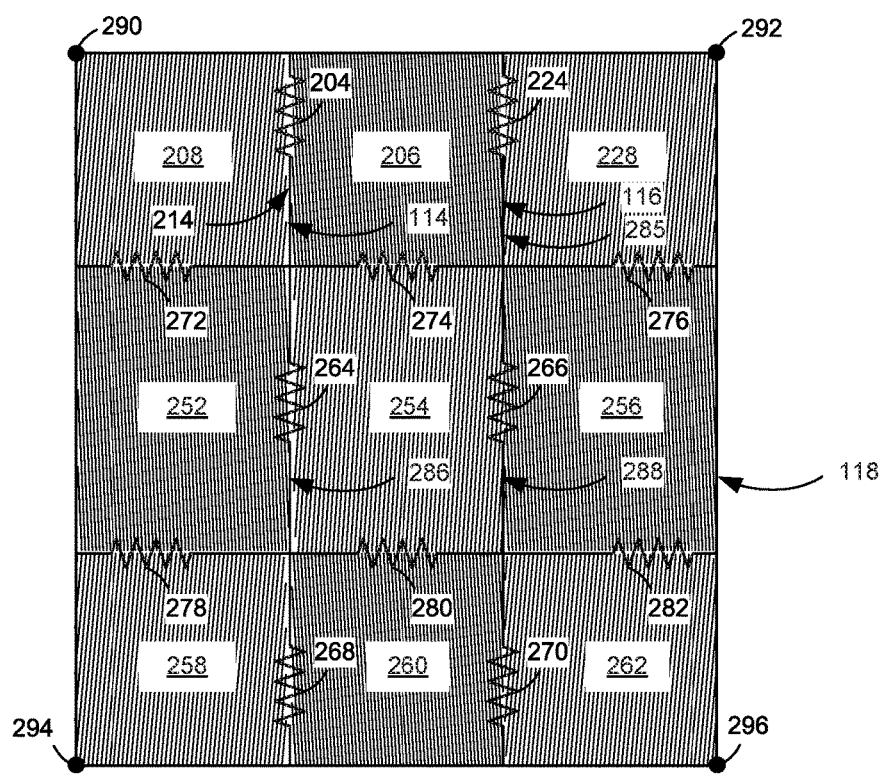
FIG. 2B illustrates an example schematic view of the calibration tool of FIG. 1, in accordance with one or more example embodiments of the present disclosure.

FIG. 2B illustrates an example schematic view of the calibration tool 112 of FIG. 1, in accordance with one or more example embodiments of the present disclosure.

Referring to FIG. 2B, the schematic view shows the silkscreen 208 of FIG. 2A, the solder mask 206 of FIG. 2A, the silkscreen 228 of FIG. 2A, the conductive layer 204 of FIG. 2A, and the conductive layer 224 of FIG. 2A. The schematic view also shows additional elements, in the Y-direction, to the cross-section view of the calibration tool 112 shown in FIG. 2A. Because of the cross-section view of FIG. 2A, the additional elements of the calibration tool 112 are not seen in FIG. 2A, but the additional elements of the calibration tool 112 shown in FIG. 2B would be coming out of the page in the Y-direction in FIG. 2A. For example, the schematic view in FIG. 2B shows that the calibration tool 112 of FIG. 1 may include a solder mask 252, a silkscreen 254, a solder mask 256, a silkscreen 258, a solder mask 260, a silkscreen 262, conductive layers (e.g., conductive layer 264, conductive layer 266, conductive layer 268, conductive layer 270, conductive layer 272, conductive layer 274, conductive layer 276, conductive layer 278, conductive layer 280, conductive layer 282). The silkscreens may be disposed over the solder masks (e.g., the solder masks may be behind the silkscreens in the Z-axis going into the page), and the conductive layers may be behind the solder masks in the Z-axis going into the page. In this manner, LIDAR signals emitted (e.g., by the LIDAR signal transmitter 120 of FIG. 1) from outside of the page in a direction along the Z-axis going into the page may return to a LIDAR sensor (e.g., the LIDAR sensor 122 of FIG. 1) and indicate that a distance to a silkscreen (e.g., the silkscreen 208) is less than a distance to a solder mask (e.g., the solder mask 206), and the LIDAR data may not identify the conductive layers that are behind the solder masks (e.g., on the Z-axis going into the page). To identify conductive layers, the thermal signal receiver 130 of FIG. 1 may detect the temperature of the calibration tool 112. Because of the known locations where the silkscreens end and expose the solder masks below, and where the conductive layers end below the solder masks, the combination of LIDAR, visible, and thermal data may be compared to determine whether the respective locations match the known locations.

Still referring to FIG. 2B, the schematic view of the calibration tool 112 shows the side or edge 114 of FIG. 2A, the side or edge 116 of FIG. 2A, the side or edge 118 of FIG. 1, the side or edge 214 of FIG. 2A, the side or edge 285 of FIG. 2A, a side or edge 286, a side or edge 288, a side or edge 290, a side or edge 292, a side or edge 294, and a side or edge 296. The side or edge 290, the side or edge 292, the side or edge 294, and the side or edge 296 may refer to respective corners of the calibration tool 112 represented by the schematic view 250. Other sides or edges may refer to sides or edges of silkscreens, solder masks, and/or conductive layers. As explained above regarding FIG. 2A, the side or edge 114 may refer to the boundary of the silkscreen 208 at which the silkscreen 208 ends and exposes the solder mask 206 below (e.g., a side or edge of the silkscreen 208, or a corner formed by the side or edge of the silkscreen 208 and the solder mask 206 below/behind the silkscreen 208). The boundary of the conductive layer 204 below the silkscreen 208 (e.g., as indicated by the side or edge 214) may align with the side or edge 114 along the X-axis. In this manner, although LIDAR and visible image sensor data may not identify the conductive layer 204 that is below/behind the silkscreen 208 and the solder mask 206, thermal sensor data may identify the conductive layer 204. Because the X-coordinate of the side or edge 114 and the side or edge 214 may be known for the calibration tool 112, the LIDAR data and the visible image data may indicate an X-coordinate for the side or edge 114, and the thermal data may indicate the same X-coordinate for the side or edge 214. In this manner, sensors using different modalities may be calibrated both individually and with respect to one another. Similarly, the a side or edge 286 may align along the X-axis with the conductive layer 264 (e.g., the side or edge boundary of the silkscreen 254 and the solder mask 252 may align along the X-axis with the side or edge boundary of the conductive layer 264 below/behind the solder mask 252), and the a side or edge 288 may align along the X-axis with the conductive layer 266 (e.g., the side or edge boundary of the silkscreen 254 and the solder mask 256 may align along the X-axis with the side or edge boundary of the conductive layer 266 below/behind the solder mask 256). Image and LIDAR data indicating the location of an object (e.g., a side, edge, or corner) may correspond to thermal data indicating the location of a conductive layer behind the object. In this manner, the calibration tool 112 represented by the schematic view of FIG. 2B may be used to calibrate LIDAR, thermal, and image sensors with respect to one another.

Figure 3:
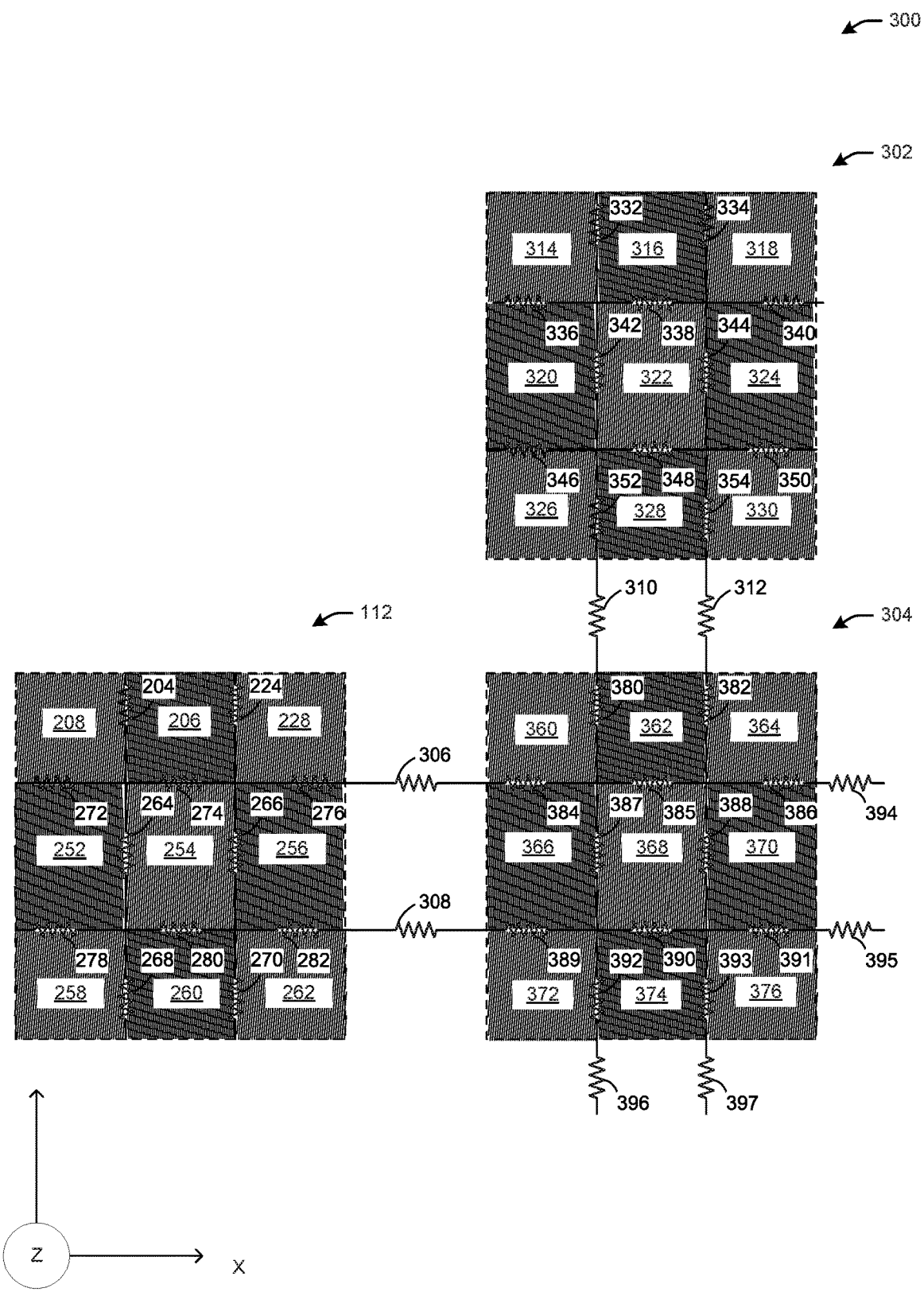
FIG. 3 illustrates an example top schematic view of a calibration tool for multispectral sensors, in accordance with one or more example embodiments of the present disclosure.

FIG. 3 illustrates an example top schematic view of a calibration tool 300 for multispectral sensors.

Referring to FIG. 3, the schematic view of the calibration tool 300 may represent an expansion of the calibration tool 112 of FIG. 1, FIG. 2A, and FIG. 2B with an expansion. In particular, the calibration tool 112 may be combined with calibration tool 302 and calibration tool 304 to form the calibration tool 300. As described above, the cross-section view of the calibration tool 112 of FIG. 2A may be expanded by adding features of a calibration tool (e.g., silkscreens, solder masks, conductive layers, etc.) along the X-axis and/or Y-axis. In FIG. 3, conductive layer 306 and conductive layer 308 may operatively connect the calibration tool 112 to the calibration tool 304, and the conductive layer 310 and the conductive layer 312 may operatively connect the calibration tool 304 to the calibration tool 302. In this manner, the calibration tool 300 may be formed by the features (e.g., sides, edges, corners, etc.) of the calibration tool 112, the calibration tool 302, and the calibration tool 304.

Still referring to FIG. 3, the schematic view of the calibration tool 112 shows the silkscreen 208 of FIG. 2A, the solder mask 206 of FIG. 2A, the silkscreen 228 of FIG. 2A, the conductive layer 204 of FIG. 2A, the conductive layer 224 of FIG. 2A, the solder mask 252, silkscreen 254, the solder mask 256, the silkscreen 258, the solder mask 260, the silkscreen 262, the conductive layer 264, the conductive layer 266, the conductive layer 268, the conductive layer 270, the conductive layer 272, the conductive layer 274, the conductive layer 276, the conductive layer 278, and the conductive layer 282. The silkscreens may be disposed over the solder masks (e.g., the solder masks may be below/behind the silkscreens in the Z-axis going into the page), and the conductive layers may be below/behind the solder masks in the Z-axis going into the page. In this manner, LIDAR signals emitted (e.g., by the LIDAR signal transmitter 120 of FIG. 1) from outside of the page in a direction along the Z-axis going into the page may return to a LIDAR sensor (e.g., the LIDAR sensor 122 of FIG. 1) and indicate that a distance to a silkscreen (e.g., the silkscreen 208) is less than a distance to a solder mask (e.g., the solder mask 206), and the LIDAR data may not be used to identify the copper layers that are below/behind the solder masks (e.g., on the Z-axis going into the page).

Still referring to FIG. 3, the calibration tool 302 includes a silkscreen 314 (e.g., similar to the silkscreen 208 of FIG. 2A), a solder mask 316 (e.g., similar to the solder mask 206 of FIG. 2A), a silkscreen 318 (e.g., similar to the silkscreen 228 of FIG. 2A), a conductive layer 332 (e.g., similar to the conductive layer 204 of FIG. 2A), and a conductive layer 334 (e.g., similar to the conductive layer 224 of FIG. 2A). The calibration tool 302 also includes additional elements such as a silkscreen 320, a solder mask 322, a silkscreen 324, a silkscreen 326, a solder mask 328, a silkscreen 330, conductive layers (e.g., conductive layer 342, conductive layer 344, conductive layer 352, conductive layer 354, conductive layer 336, conductive layer 338, conductive layer 340, conductive layer 346, conductive layer 348, conductive layer 350). The silkscreens may be disposed over the solder masks (e.g., the solder masks may be behind/below the silkscreens in the Z-axis going into the page), and the conductive layers may be behind/below the solder masks in the Z-axis going into the page. In this manner, LIDAR signals emitted (e.g., by the LIDAR signal transmitter 120 of FIG. 1) from outside of the page in a direction along the Z-axis going into the page may return to a LIDAR sensor (e.g., the LIDAR sensor 122 of FIG. 1) and indicate that a distance to a silkscreen (e.g., the silkscreen 314) is less than a distance to a solder mask (e.g., the solder mask 316), and the LIDAR data may not be used to identify the conductive layers that are behind the solder masks (e.g., on the Z-axis going into the page).

Still referring to FIG. 3, the calibration tool 304 includes a silkscreen 360 (e.g., similar to the silkscreen 208 of FIG. 2A), a solder mask 362 (e.g., similar to the solder mask 206 of FIG. 2A), a silkscreen 364 (e.g., similar to the silkscreen 228 of FIG. 2A), a conductive layer 380 (e.g., similar to the conductive layer 204 of FIG. 2A), and a conductive layer 382 (e.g., similar to the conductive layer 224 of FIG. 2A). The calibration tool 304 also shows additional elements such as a silkscreen 366, a solder mask 368, a silkscreen 370, a silkscreen 372, a solder mask 374, a silkscreen 376, conductive layers (e.g., conductive layer 384, conductive layer 385, conductive layer 386, conductive layer 387, conductive layer 388, conductive layer 389, conductive layer 390, conductive layer 391, conductive layer 392, conductive layer 393). The calibration tool 304 may be operatively connected to another calibration tool (not shown) to the right of the calibration tool 304 (e.g., along the X-axis), thereby allowing additional expansion of the calibration tool 300. The silkscreens may be disposed over the solder masks (e.g., the solder masks may be behind the silkscreens in the Z-axis going into the page), and the conductive layers may be below/behind the solder masks in the Z-axis going into the page. In this manner, LIDAR signals emitted (e.g., by the LIDAR signal transmitter 120 of FIG. 1) from outside of the page in a direction along the Z-axis going into the page may return to a LIDAR sensor (e.g., the LIDAR sensor 122 of FIG. 1) and indicate that a distance to a silkscreen (e.g., the silkscreen 360) is less than a distance to a solder mask (e.g., the solder mask 362), and the LIDAR data may not be used to identify the conductive layers that are behind the solder masks (e.g., on the Z-axis going into the page).

Figure 4:
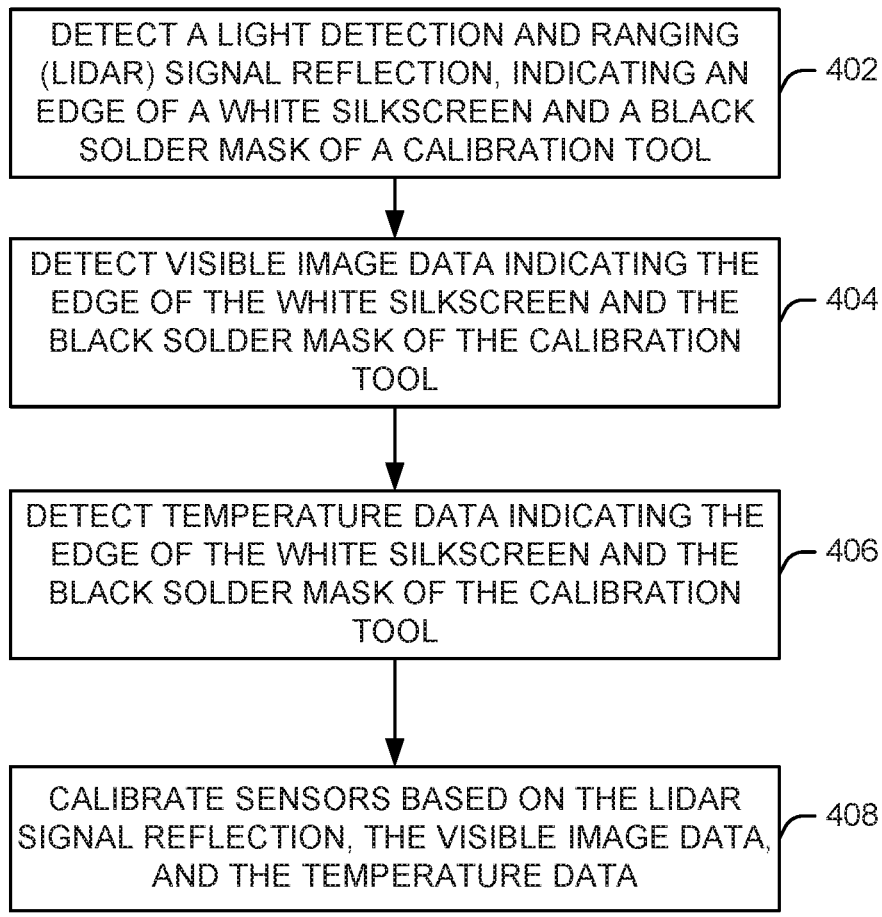
FIG. 4 illustrates a flow diagram for a process for enhanced calibration of multispectral sensors, in accordance with one or more example embodiments of the present disclosure.

FIG. 4 illustrates a flow diagram for a process 400 for enhanced calibration of multispectral sensors, in accordance with one or more example embodiments of the present disclosure.

At block 402, a LIDAR sensor (e.g., the LIDAR sensor 122 of FIG. 1) may detect a LIDAR signal reflection (e.g., a reflection caused by the calibration tool 112 of FIG. 1). For example, the LIDAR signal transmitter 120 of FIG. 1 may emit the signal 106, which may reflect off of the calibration tool 112 of FIG. 1 from the distance of d1, which may represent the distance from the LIDAR sensor to an object or feature of the calibration tool 112 (e.g., the side or edge 114, where the silkscreen layer 208 ends and exposes the solder mask 206 below the silkscreen layer 208 as shown in FIG. 2A). Using LIDAR signal reflections, an object detection device (e.g., the object detection device 104) may determine distances from the objects that cause the received reflections. When the LIDAR sensor detects a distance between the LIDAR signal and the silkscreen layer 208, and detects a distance between the LIDAR signal and the solder mask 206 (e.g., distances just to the left and to the right, along the X-axis of FIG. 2A, of the side or edge 114, the difference in distances to the silkscreen layer 208 and to the solder mask 206 may indicate the presence of the side or edge 114, which may be identified in an image using distance data detected by the LIDAR sensor.

At block 404, a visible image sensor (e.g. the visible image sensor 126 of FIG. 1) may detect visible image data of the calibration tool 112. Using captured image data (e.g., pixel data) from the visible sensor, the object detection system may identify an object or feature of the calibration tool 112 (e.g., the side or edge 114) and determine a location (e.g., an X-coordinate location in FIG. 1) of the object or feature of the calibration tool 112. The location at block 406 should match the location at block 404 when the sensor devices are properly calibrated.

At block 406, a thermal sensor (e.g. the thermal sensor 130 of FIG. 1) may detect temperatures of the calibration tool 112. The detected temperature data may be based on temperatures of materials that are below/behind the object or feature identified based on the LIDAR data of block 402 and the visible image data of block 404. The object detection system 104 may identify the presence and location of side or edge (e.g., the side or edge 214 of FIG. 2A) of a conductive layer (e.g., the conductive layer 204 of FIG. 2A) of the calibration tool (e.g., the calibration tool 112 of FIG. 1) based on the temperature data. For example, the location (e.g., X-axis coordinate of FIG. 2A) side or edge of the conductive layer associated with a temperature may align with the location (e.g., X-axis coordinate of FIG. 2A) of the side or edge of the silkscreen layer determined at blocks 402 and 404, although the conductive layer may have a different location along another axis (e.g., the Z-axis of FIG. 2A). In this manner, while the temperature data may not be used to identify the side or edge of a silkscreen layer, the temperature data may be used to identify the side or edge of a conductive layer that may align, at least along one coordinate axis, with the side or edge of the silkscreen layer (e.g., thereby also indicating the axial coordinate of the silkscreen layer based on the positional relationship between the sides or edges of the conductive layer and the silkscreen layer).

At block 410, the object detection system having or otherwise associated with the sensors of different modalities (e.g., the one or more processors 132 of FIG. 1) may calibrate, based on the detected data at blocks 402, 404, and 406, the LIDAR, visible image, and thermal sensors. Because the locations of the sides and edges of the calibration tool's silkscreens, solder masks, and conductive layers may be known (e.g., the layout and dimensions of the calibration tool may be known based on the design of the calibration tool and the placement of the calibration tool relative to the sensor devices), and because the sides or edges of the silkscreens may align with the sides or edges of the thermal layers that are behind/below the silkscreens, the location (e.g., an X-coordinate location in FIG. 2A) of the side or edge of the silkscreen and the location (e.g., an X-coordinate location in FIG. 2A) of the side or edge of the conductive layer behind/below the silkscreen should be the same. In this manner, the detected sensor data should indicate that the sides or edges detected using the LIDAR signal data, the visible image data, and the thermal data, correspond to a same set of coordinates, which should be the same as the known location of a side or edge, indicating that the sensor data of different modalities are calibrated with respect to one another. When any sensor modality data indicates a location that is inconsistent with the known location of the side or edge and/or with the determined location of the side or edge based on other sensor modality data, such may be an indication that a sensor is not properly calibrated. In this manner, the calibration tool may intrinsically and extrinsically calibrate sensors using different modalities. For example, incorrect locations determined based on the sensor data may trigger further analysis of a signal transmitter and/or receiver to identify and mitigate any design and/or operational errors that may undermine sensor performance.

Still referring to FIG. 4, while blocks 402-406 refer to analysis of individual signals of different respective modalities, the object detection system may analyze multiple signals detected by the sensors having the different modalities to identify locations of objects of the calibration tool. For example, one LIDAR signal may reflect off a silkscreen, and another LIDAR signal that is adjacent to that LIDAR signal may reflect off a solder mask. The two adjacent LIDAR signals may indicate that the silkscreen ends and exposes the solder mask (e.g., a side or edge of the silkscreen occurs at a given distance and location). Visible image data may indicate that the silkscreen ends and exposes the solder mask. Thermal data may indicate the difference in heat at the side or edge of a conductive layer and the heat where the conductive layer is not present, thereby indicating a side or edge of a conductive layer, which may align along an axis with the side or edge of a silkscreen layer.

Figure 5:
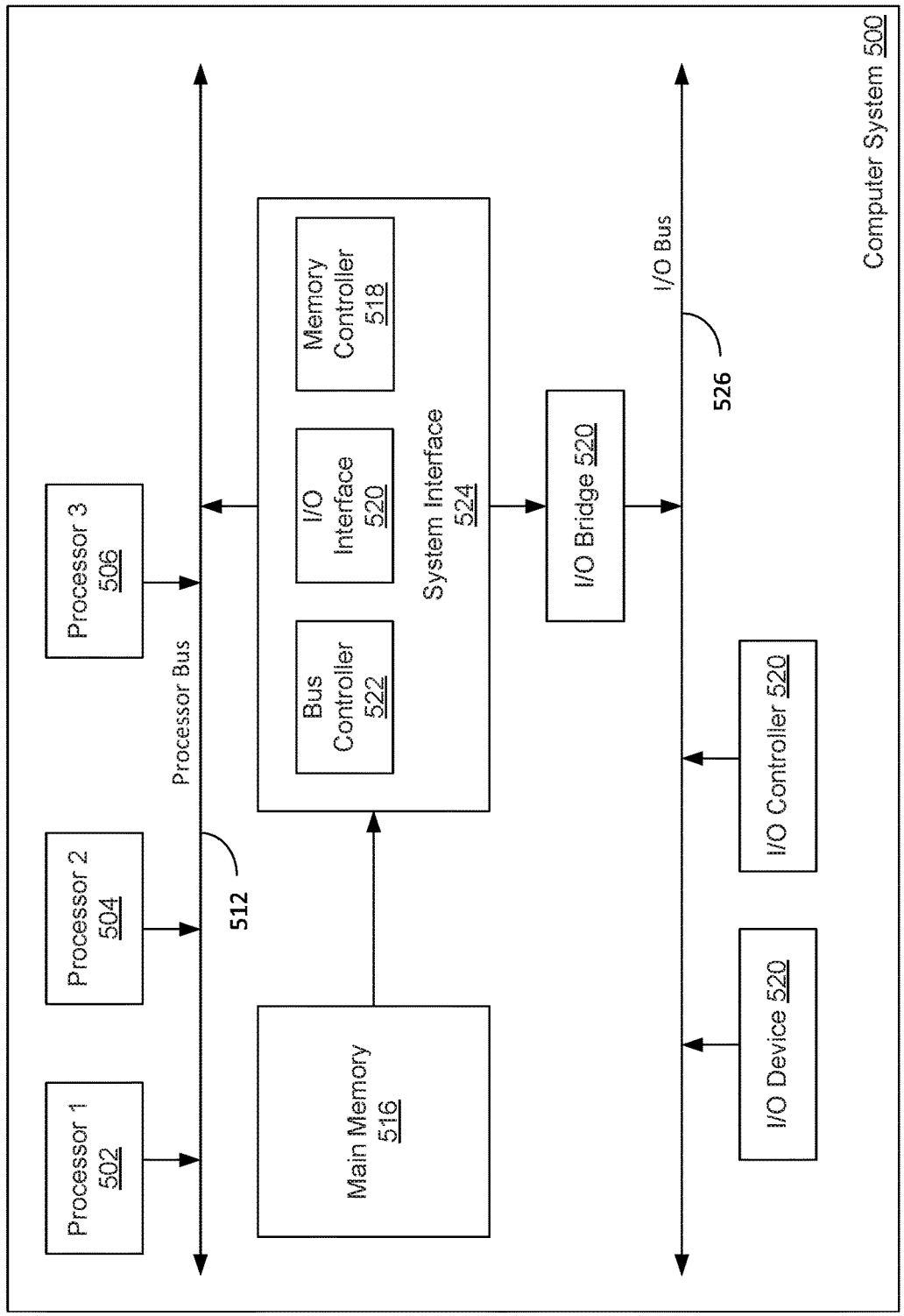
FIG. 5 is a block diagram illustrating an example of a computing device or computer system upon which any of one or more techniques (e.g., methods) may be performed, in accordance with one or more example embodiments of the present disclosure.

FIG. 5 is a block diagram illustrating an example of a computing device or computer system 500 upon which any of one or more techniques (e.g., methods) may be performed, in accordance with one or more example embodiments of the present disclosure.

For example, the computing system 500 of FIG. 5 may represent the one or more processors 132 and/or the one or more calibration modules 134 of FIG. 1, and therefore may control and calibrate sensors of the object detection system 104 of FIG. 1. The computer system (system) includes one or more processors 502-506. Processors 502-506 may include one or more internal levels of cache (not shown) and a bus controller 522 or bus interface unit to direct interaction with the processor bus 512. Processor bus 512, also known as the host bus or the front side bus, may be used to couple the processors 502-506 with the system interface 514. System interface 524 may be connected to the processor bus 512 to interface other components of the system 500 with the processor bus 512. For example, system interface 514 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

A need exists for enhanced multispectral sensor calibration. In one aspect of the disclosure, a device may include a first layer having copper, a second layer having solder material, the second layer above the first layer, and a third layer having a white silkscreen material, the third layer above the second layer. The first layer may be associated with the calibration of a thermal sensor. The second layer may be associated with calibration of an image sensor and calibration of light detection and ranging (LIDAR) sensor. The third layer may be associated with the calibration of the image sensor and the calibration of the LIDAR sensor.

In another aspect of the disclosure, the third layer partially covers the second layer. A surface of the third layer and a surface of the second layer form a visual feature. The calibration of the image sensor and the calibration of the LIDAR sensor may be based on the visual feature.

In another aspect of the disclosure, the calibration of the thermal sensor, the calibration of the image sensor, and the calibration of the LIDAR sensor may be based on the placement of the device at a distance from one or more second devices. The one or more second devices may include the thermal sensor, the LIDAR sensor, and the image sensor. The distance may be greater than zero.

In another aspect of the disclosure, the device may include a fourth layer, the fourth layer having the white silkscreen material, and the fourth layer may be above the second layer and positioned a distance greater than zero from the third layer. The fourth layer may be associated with the calibration of the image sensor and the calibration of the LIDAR sensor.

In another aspect of the disclosure, the third layer partially covers the second layer. A surface of the third layer and a surface of the second layer form a first visual feature. The fourth layer partially covers the second layer. A surface of the fourth layer and the surface of the second layer form a second visual feature. The calibration of the image sensor and the calibration of the LIDAR sensor is based on the first visual feature and the second visual feature.

In another aspect of the disclosure, the first visual feature may include a first location at which the surface of the third layer contacts the surface of the second layer and exposes the surface of the second layer. The second visual feature may include a second location at which the surface of the fourth layer contacts the surface of the second layer and exposes the surface of the second layer. The first location and the second location may be separated by a distance greater than zero.

In another aspect of the disclosure, the device may include comprising a fifth layer, the fifth layer including the white silkscreen material. The fifth layer may be above the second layer and positioned a second distance greater than zero from the third layer. The fifth layer may be associated with the calibration of the image sensor and the calibration of the LIDAR sensor.

In another aspect of the disclosure, a system may include a light detection and ranging (LIDAR) sensor, an image sensor, a thermal sensor, and a calibration tool associated with calibrating the LIDAR sensor, the image sensor, and the thermal sensor with respect to one another. The calibration tool may include a first layer having copper, a second layer having, solder material, the second layer above the first layer, and a third layer having a white silkscreen material, the third layer above the second layer. The first layer may be associated with the calibration of the thermal sensor. The second layer may be associated with the calibration of the image sensor and calibration of the LIDAR sensor. The third layer may be associated with the calibration of the image sensor and the calibration of the LIDAR sensor.

In another aspect of the disclosure, a calibration method may include sending, by a light detection and ranging (LIDAR) sensor, a first signal; sending, by an image sensor, a second signal; sending, by a thermal sensor, a third signal; receiving the first signal, the second signal, and the third signal at a location of a calibration tool, the location associated with an edge of a white silkscreen of the calibration tool and a black solder mask of the calibration tool, wherein: the white silkscreen is above the black solder mask, the black solder mask is above a copper layer of the calibration tool, and an edge of a copper layer aligns with the edge of the white silkscreen.

In another aspect of the disclosure, the calibration method may include receiving a fourth signal at the LIDAR sensor, the fourth signal indicative of the edge of the white silkscreen; receiving a fifth signal at the image sensor, the fifth signal indicative of the edge of the white silkscreen; and receiving a sixth signal at the thermal sensor, the sixth signal indicative of the edge of the copper layer.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system for calibrating sensors, the sensors including a light detection and ranging (LIDAR) sensor, a thermal sensor, and an image sensor, the system comprising:
  a calibration device comprising:
    a core layer,
    a first layer comprising a conductive material disposed on a top surface of the core layer, the first layer partially exposing the top surface of the core layer, and having a first edge and a second edge, the first edge and the second edge configured to form a first exposed region therebetween in which the top surface of the core layer is not covered by the first layer,
    a second layer comprising a solder layer disposed on a top surface of the first layer, and
    a third layer comprising a silkscreen material disposed on a top surface of the second layer, the third layer partially exposing the top surface of the second layer, and having a third edge and a fourth edge, the third edge and the fourth edge configured to form a second exposed region therebetween in which the top surface of the second layer is not covered by the silkscreen material;
wherein the first edge and the third edge are substantially aligned in a plane that is transverse to the top surface of the core layer; and
a processor configured to perform sensor calibration by:
determining, based on first sensor data received from a first one of the sensors, a location of the first edge of the calibration device,
determining, based on second sensor data received from a second one of the sensors, a location of the third edge of the calibration device, and
determining that the first one of the sensors and the second one of the sensors are calibrated if the location of the first edge and the location of the third edge are determined to be aligned in the plane that is transverse to the top surface of the core layer.

2. The system of claim 1, wherein the third edge of the third layer is detectable by the LIDAR sensor and the image sensor.

3. The system of claim 1, wherein the first edge of the first layer is detectable by the thermal sensor.

4. The system of claim 1, wherein the calibration device further comprises a fourth layer, the fourth layer comprising the silkscreen material, wherein the fourth layer is positioned on the top surface of the second layer and positioned along a horizontal axis at a distance from the third layer, the distance greater than zero.

5. The system of claim 4, wherein a side of the fourth layer is detectable by the LIDAR sensor and the image sensor.

6. The system of claim 4, wherein the calibration device further comprises a fifth layer comprising copper, the second layer positioned on the fifth layer, wherein the fifth layer is positioned along the horizontal axis at the distance from the first layer.

7. The system of claim 6, wherein a side of the fourth layer aligning along the horizontal axis with a side of the fifth layer.

8. A system for calibrating sensors, the sensors including a light detection and ranging (LIDAR) sensor, a thermal sensor, and an image sensor, the system comprising:
a calibration device comprising:
a first layer comprising copper;
a second layer comprising solder material, the second layer positioned on a top surface of the first layer; and
a third layer comprising a silkscreen material, the third layer positioned on a top surface of the second layer, the third layer partially covering the top surface of the second layer,
a side of the third layer aligning along a horizontal axis with a side of the first layer,
the second layer extending, along the horizontal axis, beyond the side of the first layer and the side of the third layer; and
a processor configured to perform sensor calibration by:
determining, based on first sensor data received from a first one of the sensors, a location of the side of the third layer of the calibration device,
determining, based on second sensor data received from a second one of the sensors, a location of the side of the first layer of the calibration device, and
determining that the first one of the sensors and the second one of the sensors are calibrated if the location of the side of the third layer and the location of the first layer are determined to be aligned along the horizontal axis.

9. The system of claim 8, wherein the side of the third layer is detectable by the LIDAR sensor and the image sensor.

10. The system of claim 8, wherein the side of the first layer is detectable by the thermal sensor.

11. The system of claim 8, wherein the calibration device further comprises a fourth layer, the fourth layer comprising the silkscreen material, wherein the fourth layer is positioned on the top surface of the second layer and positioned along the horizontal axis at a distance from the third layer, the distance greater than zero.

12. The system of claim 11, wherein a side of the fourth layer is detectable by the LIDAR sensor and the image sensor.

13. The system of claim 11, wherein the calibration device further comprises a fifth layer comprising copper, the second layer positioned on the fifth layer, wherein the fifth layer is positioned along the horizontal axis at the distance from the first layer.

14. The system of claim 13, a side of the fourth layer aligning along the horizontal axis with a side of the fifth layer.

15. The system of claim 14, wherein the processor is further configured to calibrate the image sensor and the LIDAR sensor based on a detection of the side of the fourth layer and the side of the fifth layer.

16. The system of claim 8, wherein a thickness of the first layer, the second layer, and the third layer is less than 63 millimeters.

17. The system of claim 8, wherein the solder material comprises a black solder mask.

18. The system of claim 8, wherein the silkscreen material comprises a white silkscreen.

19. A method, comprising:
receiving, by one or more processors of a device, first sensor data associated with a light detection and ranging (LIDAR) sensor;
receiving, by the one or more processors, second sensor data associated with an image sensor;
receiving, by the one or more processors, third sensor data associated with a thermal sensor;
determining, by the one or more processors and based on the first and second sensor data, locations associated with a side of a first layer of a calibration tool the first layer comprising a silkscreen material;
determining whether the LIDAR sensor and the image sensor are calibrated based on a comparison of locations of the side of the first layer as determined based on the first and second sensor data; and
determining, by the one or more processors and based on the third sensor data, a location associated with a side of a second layer of the calibration tool, the second layer comprising copper and separated from the first layer by a solder mask and wherein the side of the first layer substantially aligns with the side of the second layer.

20. The method of claim 19, wherein determining whether the LIDAR sensor and the image sensor are calibrated based on a comparison of locations of the side of the first layer as determined based on the first and second sensor data comprises:
determining, based on the first sensor data, a second location associated with the side of the first layer; and determining, based on the second sensor data, a third location associated with the side of the first layer;
determining that the second location is different from the third location; and
determining that at least one of the LIDAR sensor or the image sensor is not calibrated.

* * * * *